Patented Sept. 7, 1943

2,328,802

UNITED STATES PATENT OFFICE 2,328,802

NEW PROCESS

Albert F. Hardman, Akron, Ohio, assignor to Wingfoot Corporation, Akron, Ohio, a corporation of Delaware No Drawing. Application May 2, 1942, Serial No. 441,528

5 Claims. (Cl. 260—571)

This invention relates to a method of reacting a hydroxy aryl dithio acid with an arylamine to produce an arylidene amine. A primary amine or a diamine may be employed. The invention relates particularly to the production of hydroxy naphthylidene-amines.

It has been customary to produce hydroxy arylidene-amines by reacting an aldehyde and amine directly. It has now been found, however, that these products may readily be obtained from the dithio acid. There are advantages inherent in using this process, because the dithio acid is more easily prepared than the aldehyde. The reaction may be illustrated by the following equations which relate to the use of a primary amine and diamine respectively.

In these equations R is an aryl group, and R' is an aryl group, and R" is an arylene group. R may, for example, be phenyl or naphthyl or anthracyl substituted or unsubstituted. R" will be substituted or unsubstituted, such as phenylene, diphenyl, naphthyl, diphenyl methane, triphenyl methane, azobenzene, etc.

The invention will be further described in connection with the production of 2-hydroxy-1-naphthylidene-aniline which is produced according to the following equation:

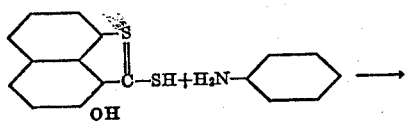

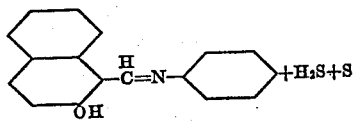

The hydrogen sulfide produced in the reaction is rapidly evolved and eliminated as a gas, and the sulfur either remains in solution or suspended as crystals in the solution, depending upon the nature of the solvent employed. The following examples are illustrative:

Example 1

The following materials were mixed:

| | | |
|---|---|---|
| 2-OH-dithionaphthoic acid | grams | 110 |
| Alcohol | cubic centimeters | 500 |
| Aniline | grams | 50 |

On adding the aniline, a suspension of the aniline salt of the dithio acid was first formed. On heating under a reflux condenser, this suspension slowly disappeared, accompanied by a vigorous evolution of H₂S gas, while the color of the solution slowly changed from deep red to a light reddish-yellow. Toward the end of the reaction, about one-half hour, crystals of sulfur separated in the refluxing liquid. The mixture was filtered hot and the filtrate cooled. Yellow crystals formed. After filtering, washing lightly with cold alcohol and drying, a large yield of bright-yellow needles, melting at about 90–91° C. was obtained.

Example 2

The following materials were mixed:

| | | |
|---|---|---|
| p,p'-Diamino-diphenyl-methane | grams | 10 |
| Alcohol | cubic centimeters | 150 |
| 2-OH-dithionaphthoic acid | grams | 22 |

The mixture was refluxed as before. H₂S came off rapidly and a voluminous, yellow suspension was formed. This was filtered off and washed with alcohol. Since this product was insoluble in hot alcohol, it also contained crystals of free sulfur formed in the reaction. For some purposes, as in rubber compounding, these would not be objectionable. However, if desired, the sulfur can be removed by extraction with hot acetone or benzene, or by recrystallization from a high-boiling solvent, such as diphenyl-ether.

What I claim is:

1. The process of producing an arylidene amine which comprises reacting an hydroxy aryl dithio acid with an aryl amine.

2. The process of producing an arylidene amine which comprises reacting an hydroxy aryl dithio acid with a primary amine.

3. The process of producing an arylidene amine which comprises reacting an hydroxy aryl dithio acid with a diamine.

4. The method of producing a naphthylidene amine which comprises reacting a hydroxy dithionaphthoic acid with an amine.

5. The method of producing 2-hydroxy 1-naphthylidene aniline which comprises reacting 2-hydroxy dithionaphthoic acid with aniline and obtaining hydrogen sulfide and sulfur as by-products.

ALBERT F. HARDMAN.

Certificate of Correction

Patent No. 2,328,802. September 7, 1943.

ALBERT F. HARDMAN

It is hereby certified that errors appear in the printed specification of the above numbered patent requiring correction as follows: Page 1, first column, line 19, for that portion of the formula reading "$H_2N.R''.NH_2OH.R.$" read $H_2N.R''.NH_2 \longrightarrow OH.R.$ ;

line 31–35, for

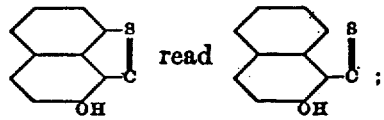

and that the said Letters Patent should be read with these corrections therein that the same may conform to the record of the case in the Patent Office.

Signed and sealed this 2nd day of November, A. D. 1943.

[SEAL]

HENRY VAN ARSDALE,
*Acting Commissioner of Patents.*